(12) United States Patent  (10) Patent No.: US 8,125,908 B2
Rothstein et al.  (45) Date of Patent: Feb. 28, 2012

(54) ADAPTIVE NETWORK TRAFFIC CLASSIFICATION USING HISTORICAL CONTEXT

(75) Inventors: Jesse Abraham Rothstein, Seattle, WA (US); Arindum Mukerji, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 104 days.

(21) Appl. No.: 12/326,672

(22) Filed: Dec. 2, 2008

(65) Prior Publication Data

US 2009/0141634 A1  Jun. 4, 2009

Related U.S. Application Data

(60) Provisional application No. 60/992,216, filed on Dec. 4, 2007.

(51) Int. Cl.
 *H04J 1/16*  (2006.01)
(52) U.S. Cl. ........................................ 370/235; 370/252
(58) Field of Classification Search ............... 370/395.3, 370/469, 474, 229–253, 351–400
See application file for complete search history.

(56) References Cited

U.S. PATENT DOCUMENTS

| | | | |
|---|---|---|---|
| 5,715,464 A | 2/1998 | Crump et al. | |
| 5,857,188 A | 1/1999 | Douglas | |
| 5,928,363 A | 7/1999 | Ruvolo | |
| 6,263,049 B1 | 7/2001 | Kuhn | |
| 6,385,729 B1 | 5/2002 | DiGiorgio et al. | |
| 6,412,000 B1 * | 6/2002 | Riddle et al. | 709/224 |
| 6,526,044 B1 | 2/2003 | Cookmeyer, II et al. | |
| 6,560,636 B2 | 5/2003 | Cohen et al. | |
| 6,704,311 B1 | 3/2004 | Chuah et al. | |
| 6,807,565 B1 | 10/2004 | Dodrill et al. | |
| 6,883,015 B1 | 4/2005 | Geen et al. | |
| 6,901,517 B1 | 5/2005 | Redmore | |
| 6,999,729 B2 | 2/2006 | Wandel | |
| 7,042,888 B2 * | 5/2006 | Berggreen | 370/401 |
| 7,177,930 B1 * | 2/2007 | LoPresti | 709/224 |
| 7,474,654 B2 * | 1/2009 | Guru | 370/389 |
| 7,535,906 B2 * | 5/2009 | Engbersen et al. | 370/392 |
| 7,580,356 B1 * | 8/2009 | Mishra et al. | 370/230.1 |
| 7,606,706 B1 | 10/2009 | Rubin et al. | |
| 7,609,630 B2 * | 10/2009 | Gobeil | 370/230 |
| 7,639,613 B1 * | 12/2009 | Ghannadian et al. | 370/232 |
| 7,644,150 B1 * | 1/2010 | Nucci et al. | 709/223 |
| 7,774,456 B1 * | 8/2010 | Lownsbrough et al. | 709/224 |

(Continued)

OTHER PUBLICATIONS

Mark Lin; "An Overview of Session Hijacking at the Network and Application Levels"; Jan. 18, 2005; 16 pages.

(Continued)

*Primary Examiner* — Andrew Lai
*Assistant Examiner* — Juvena Loo
(74) *Attorney, Agent, or Firm* — Meyertons Hood Kivlin Kowert & Goetzel, P.C.; Jeffrey C. Hood; Joel L. Stevens

(57) ABSTRACT

Adaptive network traffic classification using historical context. Network traffic may be monitored and classified by considering several attributes using packet filters, regular expressions, context-free grammars, rule sets, and/or protocol dissectors, among other means and by applying a variety of techniques such as signature matching and statistical analysis. Unlike static systems, the classification decisions may be reexamined from time to time or after subsequent processing determines that the traffic does not conform to the protocol specification corresponding to the classification decision. Historical context may be used to adjust the classification strategy for similar or related traffic.

19 Claims, 4 Drawing Sheets

U.S. PATENT DOCUMENTS

| | | | |
|---|---|---|---|
| 7,916,652 B1 * | 3/2011 | Lima et al. | 370/252 |
| 2002/0023080 A1 * | 2/2002 | Uga et al. | 707/1 |
| 2002/0035604 A1 | 3/2002 | Cohen et al. | |
| 2002/0055998 A1 * | 5/2002 | Riddle et al. | 709/224 |
| 2002/0065912 A1 | 5/2002 | Catchpole et al. | |
| 2002/0152209 A1 * | 10/2002 | Merugu et al. | 707/7 |
| 2003/0131116 A1 * | 7/2003 | Jain et al. | 709/230 |
| 2003/0135667 A1 * | 7/2003 | Mann et al. | 710/5 |
| 2003/0212900 A1 * | 11/2003 | Liu et al. | 713/200 |
| 2003/0233361 A1 | 12/2003 | Cady | |
| 2004/0093414 A1 | 5/2004 | Orton | |
| 2004/0146006 A1 | 7/2004 | Jackson | |
| 2004/0199630 A1 * | 10/2004 | Sarkissian et al. | 709/224 |
| 2005/0066196 A1 | 3/2005 | Yagi | |
| 2005/0086255 A1 | 4/2005 | Schran et al. | |
| 2005/0125553 A1 | 6/2005 | Wu et al. | |
| 2005/0201363 A1 | 9/2005 | Gilchrist et al. | |
| 2005/0251009 A1 | 11/2005 | Morita et al. | |
| 2006/0045016 A1 | 3/2006 | Dawdy et al. | |
| 2006/0184535 A1 | 8/2006 | Kaluskar et al. | |
| 2006/0230456 A1 | 10/2006 | Nagabhushan et al. | |
| 2007/0039051 A1 | 2/2007 | Duthie et al. | |
| 2007/0077931 A1 | 4/2007 | Glinka | |
| 2007/0157306 A1 | 7/2007 | Elrod et al. | |
| 2008/0031141 A1 * | 2/2008 | Lean et al. | 370/241 |
| 2008/0059582 A1 | 3/2008 | Hartikainen et al. | |
| 2008/0212586 A1 * | 9/2008 | Wang et al. | 370/392 |
| 2008/0219261 A1 * | 9/2008 | Lin et al. | 370/392 |
| 2008/0232359 A1 * | 9/2008 | Kim et al. | 370/389 |
| 2009/0010259 A1 * | 1/2009 | Sirotkin | 370/392 |
| 2009/0034426 A1 * | 2/2009 | Luft et al. | 370/252 |
| 2009/0168657 A1 * | 7/2009 | Puri et al. | 370/248 |

OTHER PUBLICATIONS

U.S. Appl. No. 11/683,643, entitled "Detecting Anomalous Network Application Behavior", by Jesse Abraham Rothstein and Arindum Mukerji, filed on Mar. 8, 2007; 40 pages.

U.S. Appl. No. 11/679,356, entitled "Capture and Resumption of Network Application Sessions", by Jesse Abraham Rothstein and Arindum Mukerji, filed on Feb. 27, 2007; 37 pages.

* cited by examiner

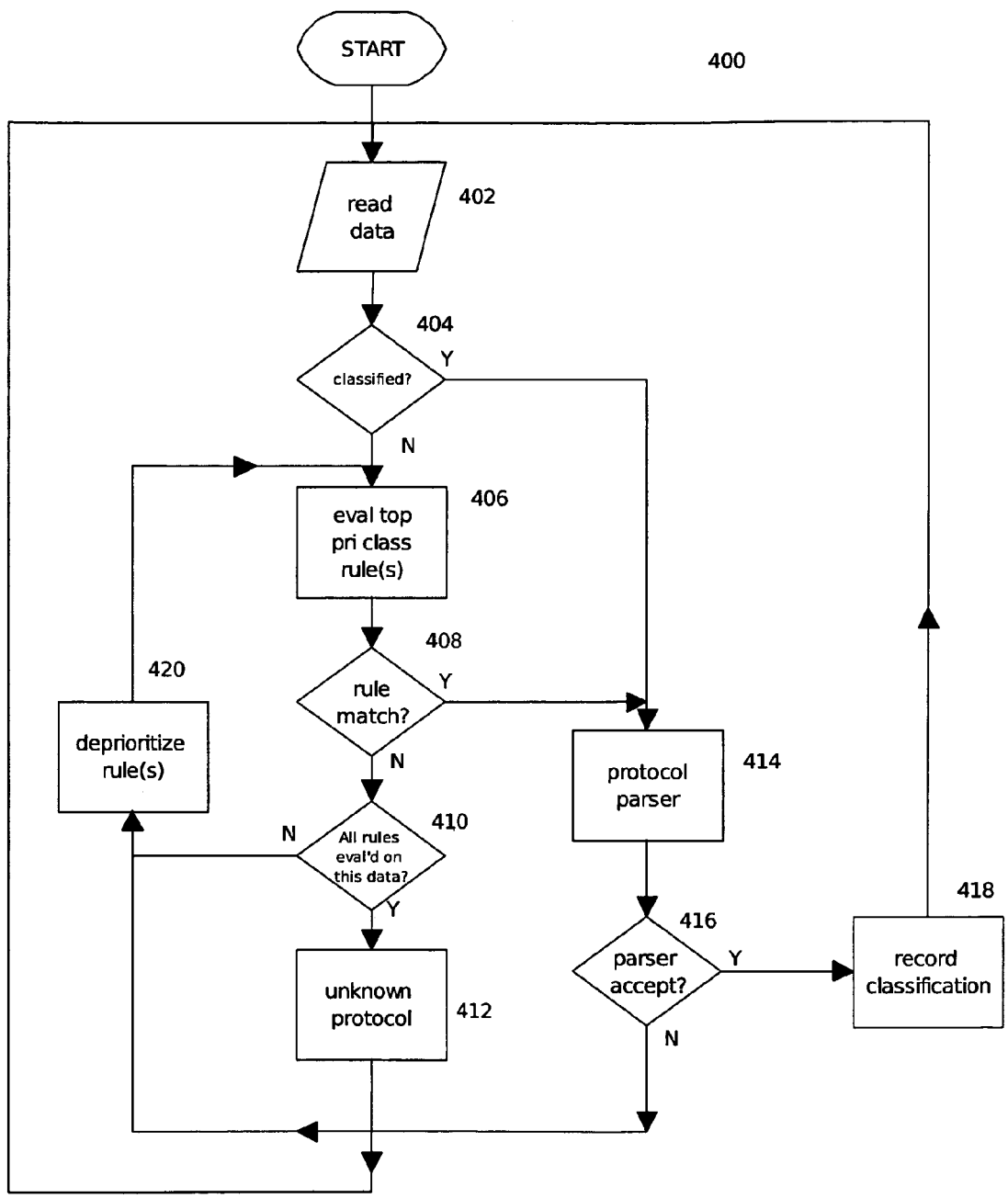
FIGURE 4: Adaptive Protocol Classification Using History Flow Chart

ADAPTIVE NETWORK TRAFFIC CLASSIFICATION USING HISTORICAL CONTEXT

PRIORITY CLAIM

This application claims benefit of priority of U.S. provisional application Ser. No. 60/992,216, titled "Adaptive Network Traffic Classification Using Historical Context", filed Dec. 4, 2007, whose inventors are Jesse Abraham Rothstein and Arindum Mukerji and which is hereby incorporated by reference in its entirety as though fully and completely set forth herein.

FIELD OF THE INVENTION

The present invention relates to the field of computer networks and more particularly to a system and method for adaptive network traffic classification using historical context.

DESCRIPTION OF THE RELATED ART

On most of today's computer networks, data is packaged into collections of bytes called packets. The packets are generally transmitted and received by a network interface card (NIC) (e.g., of a computer) in a wired manner, e.g., over a physical medium, such as a cable, or in a wireless manner. Additionally, the packets are typically transmitted and received according to a network communication protocol suite, such as TCP/IP, among others. Network protocols are layered on top of one another to form a protocol stack. For example, IP packets may contain TCP segments. TCP payload may contain SSL protocol messages, and the SSL payload in turn may contain HTTP protocol transactions. The deepest layer of protocol stack is commonly referred to as the application layer.

Network monitors are able to assess the health of and troubleshoot computer networks. These tools have typically taken the form of software applications or specialized network devices. Some network monitors record or analyze packets as they are transmitted over the network. Such tools are commonly called packet sniffers. Packet sniffers that further analyze or dissect the underlying network or application protocols are called protocol analyzers. In general, packet sniffers and protocol analyzers passively monitor network traffic without participating in the communication protocols. In some instances, they receive a copy of each packet on a particular network segment or VLAN. This is generally done though a port mirror or SPAN port on a managed Ethernet switch or through the use of a specialized network tap. In other instances, they are placed in the network between two or more devices and copy packets from one interface to the other.

Unlike protocol analyzers, network proxies do participate in the communication protocols. Network proxies are placed in the network path between the endpoints. Proxies provide a variety of services, such as caching, content filtering, and access control.

A filter machine, such as the Berkeley Packet Filter, is commonly used to extract information from network traffic. A filter machine can execute a sequence of instructions for extracting and testing values from absolute or relative offsets within the packet or stream. Filter machines can be implemented in hardware or software. A filter machine may execute a certain set of instructions in software while offloading or accelerating another set of instructions to hardware. Filter machine programs can be created to perform traffic classification.

A regular expression is a string (called a pattern) that is used to describe or match a set of strings according to certain syntax rules. Regular expressions are commonly used for content inspection and traffic classification. Regular expressions can be implemented in hardware, software, or some combination of the two. The L7-filter project is a collection of regular expressions to classify network protocols.

A context-free grammar is a precise description of a formal language where the left-hand side of each production rule comprises a single nonterminal symbol. Context-free grammars are often specified in Backus-Naur Form (BNF). Within computer science, algorithms for generating parsers for context-free grammars are well known and well understood. Since network protocols are often specified using a simplified BNF, parsers can be generated to process such protocols. Bison, yacc, and ANTLR are open-source parser generators for context-free grammars.

A rule or rule set is a sequence of instructions or program fragment for inspecting network traffic and optionally taking some action. Rules are typically written in a high-level scripting language such as TCL, PERL, or Python. Some rule languages are specialized or proprietary. Rules often support regular expression evaluation, string operations, and specialized commands for extracting information and processing network traffic. SNORT, a popular open-source intrusion detection and prevention system uses a specialized rule language for processing network traffic.

A protocol dissector is a module or plugin for protocol processing within a software application or networking device. New protocol dissectors can be added in order to support additional protocols. Protocol dissectors may be written to a published API which may provide support for registering the dissector as well as inspecting and/or modifying the network traffic. Wireshark, a popular open-source network analyzer, supports a large number of dissectors in order to analyze network traffic.

Traffic classification is the act of determining the categories of use, network protocols, and/or applications to which network traffic corresponds. Network software and devices may perform traffic classification for a variety of reasons, including metric collection, bandwidth provisioning, resource allocation, and security policy enforcement. For example, a rate shaper might perform traffic classification in order to assign a quality of service (QoS) level to the traffic. A protocol analyzer might perform initial protocol classification before conducting a more thorough analysis of the traffic in order to troubleshoot problems or collect metrics. A stateful-inspection firewall might perform protocol classification in order to make a policy decision. Intrusion detection and intrusion prevention systems (IDS/IPS) perform signature matching of the network traffic against a signature rule set. In many cases, signature matching is a form of traffic classification.

A traffic classifier might consider several attributes of the traffic and apply a variety of techniques in order to make a classification decision. This logic may be specified using packet filters, regular expressions, context-free grammars, rule sets, and/or protocol dissectors, among other means. The TCP and UDP layer-4 transport protocols have port numbers which are assigned to specific uses. In many cases, these well-known ports are registered by the Internet Assigned Numbers Authority (IANA). The layer-4 port might be used for protocol classification. Many protocols include a unique sequence of data or a signature that can be used to identify the protocol. Therefore, signature matching might be used for protocol classification. Note that a signature can be used in both a positive and negative sense. That is, a signature might identify a protocol or it might eliminate a set of protocols from consideration. Some protocol communications are unidirectional or are known to be initiated by a particular party, so the traffic direction might be used for classification. Many protocols result in traffic that follows a particular pattern, so statistical traffic analysis might be used for classification.

Accurate traffic classification is a difficult problem for several reasons. First, there are many network protocols in common use, and many of these protocols look alike. It can be difficult to distinguish two similar protocols from one another. Many protocols can use the same layer-4 port or can use unregistered or non-standard ports. This means that protocol classifiers cannot always rely on the layer-4 port even if it is assigned to a specific use. Many protocol implementations do not strictly adhere to the specifications, making it difficult to distinguish between an out-of-spec client or server and an unknown protocol. The ability to perform traffic classification with greater accuracy would be desirable.

SUMMARY OF THE INVENTION

Various embodiments of a system and method for adaptive network traffic classification using historical context are presented herein.

In one embodiment, a network monitor device (NMD) monitors network traffic. The NMD may track network connections from and to the client and/or server. The NMD may also extract information from the packets including protocol information at various layers of the protocol stack. The NMD may extract information from one or more packets from each of a plurality of connections. The NMD may reassemble or reconstruct the stream of data exchanged between the endpoints. The NMD may perform decryption of the payload at various layers of the protocol stack. The NMD may passively monitor the network traffic or it may participate in the protocols as a proxy. In one embodiment, the NMD attempts to classify the network traffic according to communication protocols that are used. In one embodiment, the NMD categorizes the traffic where categories might include file transfers, streaming audio, streaming video, database access, interactive, gaming, and the like. In another embodiment, the NMD determines whether the traffic corresponds to known communications protocols, such as HTTP, FTP, SMTP, RTP, TDS, and the like.

In a static system, once network traffic has been classified, the decision is never revisited. However, an adaptive system for traffic classification reexamines the classification decisions. Thus, while a static system may provide an immediate classification that could be incorrect, an adaptive system may correct such a problem and provide eventual correct classification. In one embodiment, the classification decision is reevaluated from time to time or after a certain amount of traffic has been processed. In another embodiment, the traffic is subsequently processed more completely according to the classification. If this secondary processing fails because the traffic does not conform to the protocol specification, then the classification decision may be revisited. Thus the method may periodically re-determine the network traffic classification, thus providing a "historical context" for the classification.

If network traffic is classified incorrectly for one connection, then it is likely to be classified incorrectly for similar or related connections in the future. A system that does not rely on historical context will continually misclassify such traffic. However, a system that uses historical context can adjust its classification strategy for similar or related connections. In one embodiment, related connections are connections that use the same identifying characteristics. Such identifying characteristics may include, for example, the hardware address, the IP address or range of IP addresses, the IP protocol, the layer-4 port or range of layer-4 ports, or some combination thereof. In another embodiment, related connections are connections that are between the same endpoints or groups of endpoints. In another embodiment, related connections are connections that occur near one another in time.

In one embodiment, as noted above, the method examines packets from a plurality of related connections in performing network traffic classification. The method may also periodically re-determine ore reevaluate the network traffic classification for these related connections.

BRIEF DESCRIPTION OF THE DRAWINGS

A better understanding of the present invention can be obtained when the following detailed description of the preferred embodiment is considered in conjunction with the following drawings, in which:

FIG. 4 is a flowchart diagram of an exemplary process for adaptive network traffic classification using historical context.

Figure 1:
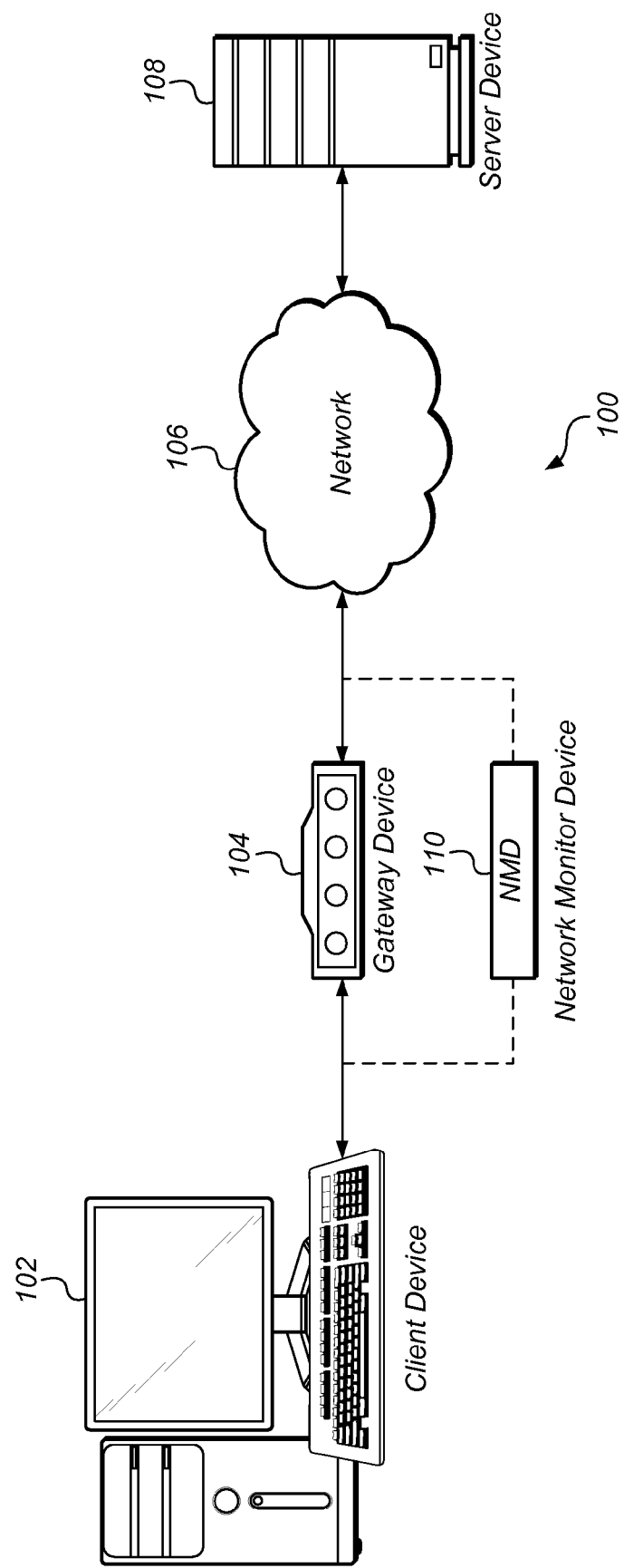
FIG. 1 illustrates a functional block diagram of an exemplary system according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention.

DETAILED DESCRIPTION OF THE INVENTION

Terms

The following is a glossary of terms used in the present application:

Memory Medium—Any of various types of memory devices or storage devices. The term "memory medium" or "memory" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

Computer System—any of various types of computing or processing systems, including a personal computer system (PC), mainframe computer system, workstation, network appliance (e.g., router, hub, switch, etc.), Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Network Connection—a specific exchange of packets over one or more physical or wireless links that enable a computing device to communicate with another computing device over a network. A "communication endpoint" refers to one of the computing devices participating in a network connection. One such network connection may be a TCP connection. TCP connections are virtual connections between two computing devices over a network that initiate, exchange data, and terminate according to the TCP protocol. The TCP protocol is described in more detail in RFC 793, which is available through the IETF. A network connection "over" a particular path or link refers to a network connection that employs the specified path or link to establish and/or maintain a communication.

Client, Server—As used herein the term "client" refers to a computing device's general role as a requester of data or services, and the term "server" refers to a computing device's role as a provider of data or services. In general, it is possible that a computing device can change its role from client to server or vice versa, acting as a client in one transaction and as a server in another transaction or both simultaneously.

Application Session or Session—a series of application interactions between two or more communication endpoints over a network that occur within one or more network connections. Several sessions can use the same network connection, and sessions may span multiple individual connections in parallel or in series.

Application Protocol—a network communication protocol that occupies layer 7 of the ISO Open Systems Interconnection (OSI) seven layer model and/or layer 4 (or 5) of the TCP/IP Internet Reference Model. Common application protocols include HTTP, SMTP, SIP, RTSP, SSH, RTP, and FTP. Within this specification, protocols that can work in conjunction with or on top of HTTP, such as SOAP, are also considered application protocols. The term "Application Protocol" may also be referred to as "Application Layer".

Embodiments of the present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, embodiments of the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

FIG. 1—Illustrative Operating Environment

FIG. 1 illustrates a block diagram of an exemplary system according to one embodiment of the present invention. However, it should be noted that not all of the illustrated components may be required to practice the invention. Additionally, the specific arrangement and connections shown are not intended to limit the scope of the invention. In other words, other arrangements, configurations, connections, and/or systems are envisioned. Thus, further variations or modifications to these illustrated or described components are envisioned.

As shown in FIG. 1, system 100 may include client device 102, gateway device 104, network 106, server device 108, and Network Monitoring Device (NMD) 110. As shown, client device 102 may communicate with server 108 through gateway device 104 and over network 106. In some embodiments, NMD 110 may be configured to observe this communication. In various embodiments, the NMD 110 may be physically or virtually connected to the network on either or both sides of gateway device 104. Although not shown, NMD 110 may monitor the communications over other types of networks, e.g., wireless networks. The NMD 110 may operate to perform detection of anomalous network behavior as described herein.

One embodiment of client device 102 is described in more detail below in conjunction with FIG. 2 (where it is depicted as client device 200). The client device 102 may include virtually any computing device capable of communicating with another computing device. Such communication may include requesting or providing data or services including, for example, HTTP transactions, Voice over Internet Protocol (VOIP), Instant Messaging (IM), file transfers, email, and the like. The set of such devices may include devices that typically connect using a wired communications or carrier medium such as personal computers, microprocessor-based or programmable consumer electronics, video gaming consoles, network media players, network PCs, and the like. The set of such devices may also include devices that typically connect using a wireless communications medium such as mobile phones, radio frequency (RF) devices, infrared (IR) devices, integrated devices combining one or more of the preceding devices, or virtually any mobile device. Similarly, the client device 102 may be any device that is capable of communicating over a wired or wireless communication medium such as a Personal Digital Assistant (PDA), Ultra Mobile PC (UMPC), wearable computer, and the like.

The client device 102 may further include various client applications. For example, the client device 102 may include a web browser that transmits HTTP requests over the network 106. In addition, the client device 102 may employ a variety of other client applications to communicate with other devices over network 106, including, but not limited to Voice Over Internet Protocol (VOIP), Instant Messaging (IM), email, Peer-to-Peer file sharing (P2P), or the like. In one embodiment, the client device 102 may employ a plurality of network sessions over one or more possibly secure network connections to another computing device, such as gateway 104, server device 108, or the like. In another embodiment, the client device 102 may employ a tunneling protocol, such as Layer-2 Tunneling Protocol (L2TP), in order to communicate remotely with computing devices such as the gateway 104.

In various embodiments, the client device 102 may communicate with network 106 employing a variety of network interfaces and associated communication protocols. Client device 102 may, for example, have broadband access in the form of a Digital Subscriber Line (DSL), Integrated Services Digital Network (ISDN), cable modem, Digital Signal 1 (DS1) or T1 circuit, Worldwide Interoperability for Microwave Access (WiMAX), or the like. Client device 102 may further employ communication protocols such as Serial Line IP (SLIP) protocol, Point to Point Protocol (PPP), Synchronous Optical Networking (SONET), Asynchronous Transfer Mode (ATM), as well as any of a variety of wireless networking protocols.

The network 106 is configured to allow network connections between client device 102, and other networked devices, such as server device 108. The network 106 may be configured to employ any form of carrier medium for communicating information from one computing device to another. In one embodiment, the network 106 may be the Internet, and may include local area networks (LANs), wide area networks (WANs), direct connections, such as through a universal serial bus (USB) port, Ethernet link, other forms of carrier media, or any combination thereof. On an interconnected set of computer networks, including those based on differing architectures and protocols, a router may be configured to forward packets from one network to another. Communication links within LANs may include unshielded twisted pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), optical fiber links, wireless links including satellite links, or other communications links known to those skilled in the art. Note that the above enumerated communication links, networks, device, and protocols are exemplary only and that other systems, processes, and configurations are envisioned.

The network 106 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as the client device 102, and the like, with various degrees of mobility. For example, the network 106 may enable a wireless network connection over one of the aforementioned access technologies using a protocol for wireless data transfer such as Global System for Mobil communication (GSM), General Packet Radio Services (GPRS), Enhanced Data GSM Environment (EDGE), Wideband Code Division Multiple Access (WCDMA), and the like.

Furthermore, remote computing devices and other related electronic devices could be remotely connected to either LANs or WANs via a modem and/or analog telephone link. In essence, the network 106 includes any communication method or carrier medium by which information may be exchanged between the client device 102 and the server device 108.

The gateway device 106 includes virtually any device that forwards network traffic. Such devices include, for example, routers, proxies, firewalls, access points, link load balancers, devices that perform network address translation, or any combination of the preceding devices. The gateway device 106 may receive data packets from and transmit data packets to the Internet, an intranet, or a LAN accessible through another network, among others. The gateway device 106 may recognize packets that are part of a particular communication protocol and/or are the same network connection or application session. The gateway device 106 may perform special processing on such packets including granting access to the client machine, logging or not logging an event, and network address and port translation.

The NMD 110 may include virtually any device that monitors network traffic. In various embodiments, the NMD 110 may be or include, for example, packet sniffers, protocol analyzers, and the like. In one embodiment, the NMD 110 may receive a copy of each packet transmitted or received by the client device 102. These packets may be copied and delivered by the gateway device 106. Although not pictured, these packets may be copied and delivered by an Ethernet switch, hub, or the like. Alternatively, these packets may be received and then retransmitted by the NMD 110. In one embodiment, the NMD 110 may be integrated directly with the gateway device 104. In another embodiment, the NMD 110 may be placed in the network path between the client device and the server device. In another embodiment, the NMD 110 may be integrated directly with the client device 102 where it may be implemented as software, hardware, or some combination thereof. In another embodiment, the NMD 110 may include a cluster of network devices working together on one or more networks. In another embodiment, NMD 110 may include a collection of client applications working together on one or more client devices. In some embodiments, the NMD 110 may employ a process substantially similar to that described below in conjunction with FIG. 4 to perform at least some of its actions.

In one embodiment, the NMD 110 may be implemented using one or more personal computers, servers, microprocessor-based or programmable consumer electronics, video gaming consoles, network media players, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. An embodiment of a network device that could be used as the NMD 110 is the network device 300 of FIG. 3, configured with appropriate software.

Server device 108 may include any computing device capable of establishing and/or maintaining a network connection with the client device 102. In one embodiment, the server device 108 is configured to operate as a web server. However, the server device 108 may also operate as a messaging server, File Transfer Protocol (FTP) server, database server, chat server, media server, online gaming server, and the like. Additionally, the server device 108 may be a single component in a larger online application. Devices that may operate as the server device 108 include personal computers, multiprocessor systems, microprocessor-based or programmable consumer electronics, network PCs, integrated devices combining one or more of the preceding devices, and the like.

Figure 2:
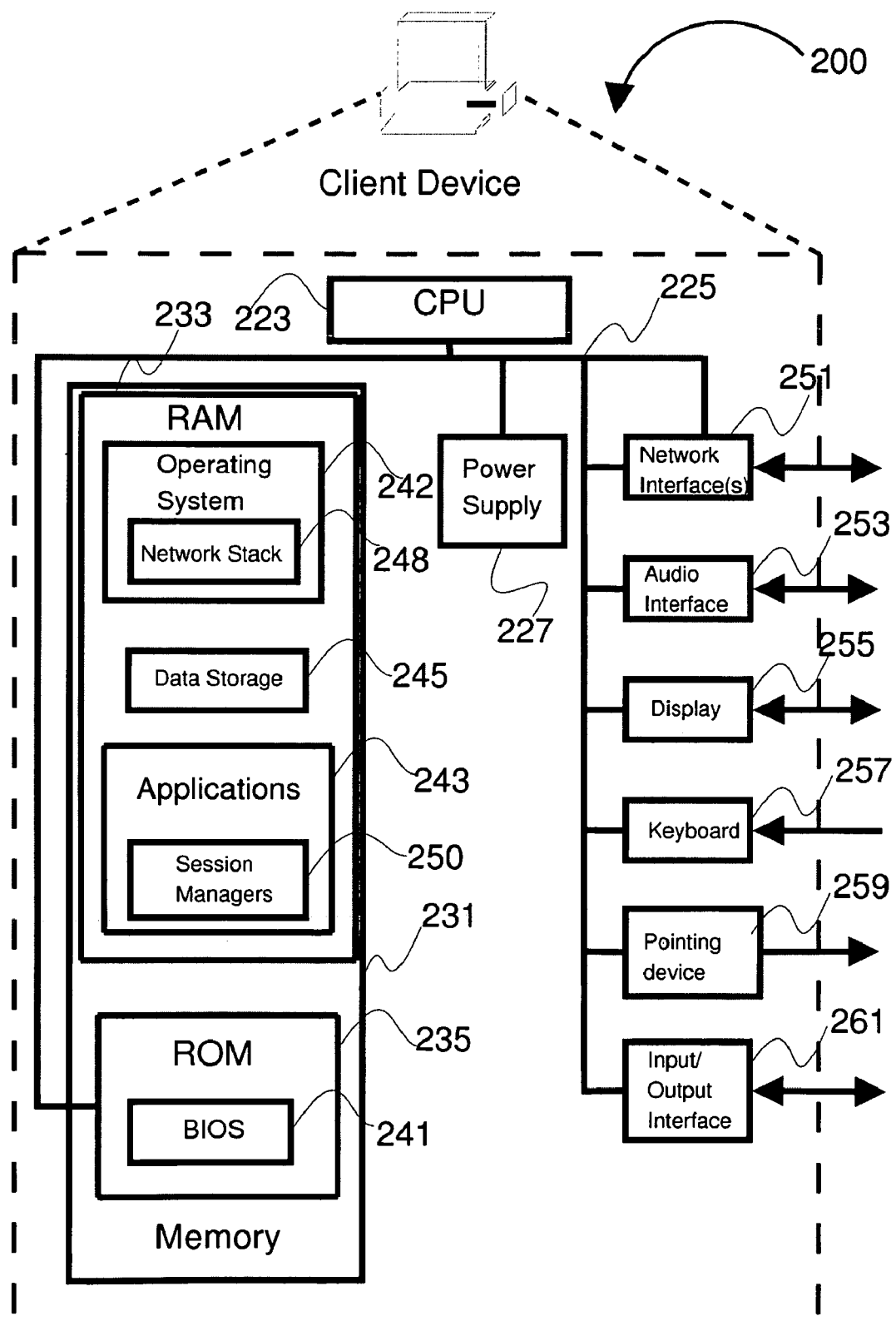
FIG. 2 illustrates an exemplary client device according to one embodiment.

FIG. 2—Illustrative Client Device

FIG. 2 shows one embodiment of client device 200 that may be included in a system implementing the invention. Client device 200 represents one embodiment of an implementation of client device 102 of FIG. 1.

Generally, the client device 200 may include any personal electronic device. Oftentimes, electronic devices may be capable of personal communication by connecting to one or more wired and/or wireless networks, connecting to multiple nodes of a single wired and/or wireless network, communicating over one or more channels to one or more networks, or otherwise engaging in one or more network connections. The client device 200 may, for example, comprise electronic devices such as Personal Digital Assistants (PDAs), handheld computers, personal computers, microprocessor-based or programmable consumer electronics, video gaming consoles, network media players, network PCs, wearable computers, or the like. The client device 200 may also include a server device, such as the server device 200, among others.

The client device 200 may include many more or less components than those shown in FIG. 2. As shown in the figure, the client device 200 includes a processing unit 223 in communication with memory 231 via bus 225.

The client device 200 may also include a power supply 227, one or more network interfaces 251, an audio interface 253, a display 255, a keyboard 257, a pointing device 259, and/or an input/output interface 261, among others. The power supply 227 may provide power to client device 200. Note that in some embodiments, a rechargeable or non-rechargeable battery may be used to provide power. The power may also be provided by an external power source, such as an AC adapter or a powered docking cradle that supplements and/or recharges a battery.

The client device 200 may optionally communicate with a base station (not shown), or directly with another computing device. The network interface 251 may allow the client device 200 to communicate over one or more networks, and may be constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and/or the like. Network interface 251 may sometimes be referred to as a transceiver, transceiving device, or network interface card (NIC).

The audio interface 253 is arranged to produce and receive audio signals such as the sound of a human voice. For example, the audio interface 253 may be coupled to a speaker and microphone (not shown) to enable telecommunication with others and/or generate an audio acknowledgment for some action. The display 255 may be a liquid crystal display (LCD), gas plasma, light emitting diode (LED), cathode ray tube (CRT), or any other type of display used with a computing device. The display 255 may also include a touch sensitive screen arranged to receive input from an object such as a stylus or a digit from a human hand.

The keyboard 257 may comprise any input device arranged to receive input from a user. For example, the keyboard 257 may include a push button numeric dial, or a keyboard. The keyboard 257 may also include command buttons that are associated with launching software applications or executing a predefined series of commands. The Pointing device 259 may comprise a trackball, mouse, stylus, or the like.

The client device 200 also comprises input/output interface 261 for communicating with external devices, such as a headset, or other input or output devices not shown in FIG. 2. Input/output interface 261 can utilize one or more communication technologies, such as USB, infrared, Bluetooth™, or the like.

The memory 231 may include a RAM 233, a ROM 235, and other storage means. The memory 230 illustrates another example of computer storage media for storage of information such as computer readable instructions, data structures, program modules or other data. The memory 231 may store a basic input/output system ("BIOS") 241 for controlling low-level operation of the client device 200. The memory 231 may also store an operating system 242 for controlling the operation of the client device 200. It will be appreciated that this component may include a general purpose operating system such as a version of UNIX or Linux, a specialized client communication operating system such as Windows Mobile™ or the Symbian™ operating system, Google Android™ operating system, or an embedded or real-time operating system such as VxWorks or Neutrino. The operating system 242 may include, or interface with a Java virtual machine module that enables control of hardware components and/or operating system operations via Java application programs.

The operating system 242 may also include network stack 248. The network stack 248 may represent a suite of components that enable various networking communications. The network stack 248 may be referred to as a TCP/IP stack, a TCP/IP protocol suite, or a networking protocol stack. The network stack 248 may be configured to manage various networking communication protocols within layers 3 and 4 (e.g., the network layer, and the transport layer) of the seven-layer protocol stack as defined by the ISO-OSI (International Standards Organization-Open Systems Interconnection) framework. For example, the network stack 248 may include components configured to manage TCP, UDP, RTP, SCTP, SPX communications, or the like. The network stack 248 may also include components configured to manage IP, ICMP, ARP, BGP, OSPF, RIP, IGRP, X.25 communications, or the like. Moreover, the network stack 248 may be configured to operate in conjunction with various security applications to enable the client device 200 to request and/or establish one or more tunneled network connections with another computing device, including L2TP over DTLS, PPP over SSH, or a variety of other tunneling connection types and/or protocols, including L2TP, PPP, PPTP, IPSec, GRE, MBone, SSL/TLS, and the like.

The memory 231 may further include at least one data storage 245, which can be utilized by the client device 200 to store, among other things, applications 243 and/or other data. For example, the data storage 245 may also be employed to store information that describes various capabilities of the client device 200. The information may then be provided to another device based on any of a variety of events, including being sent as part of a header during a communication, sent upon request, or the like.

The applications 243 may include computer executable instructions which, when executed by the client device 200, transmit, receive, and/or otherwise process messages (e.g., SMS, MMS, IM, email, and/or other messages), audio, video, and enable telecommunication with another user of another client device. Other examples of application programs include calendars, browsers, email clients, contact managers, task managers, transcoders, database programs, word processing programs, security applications, spreadsheet programs, games, and so forth.

Figure 3:
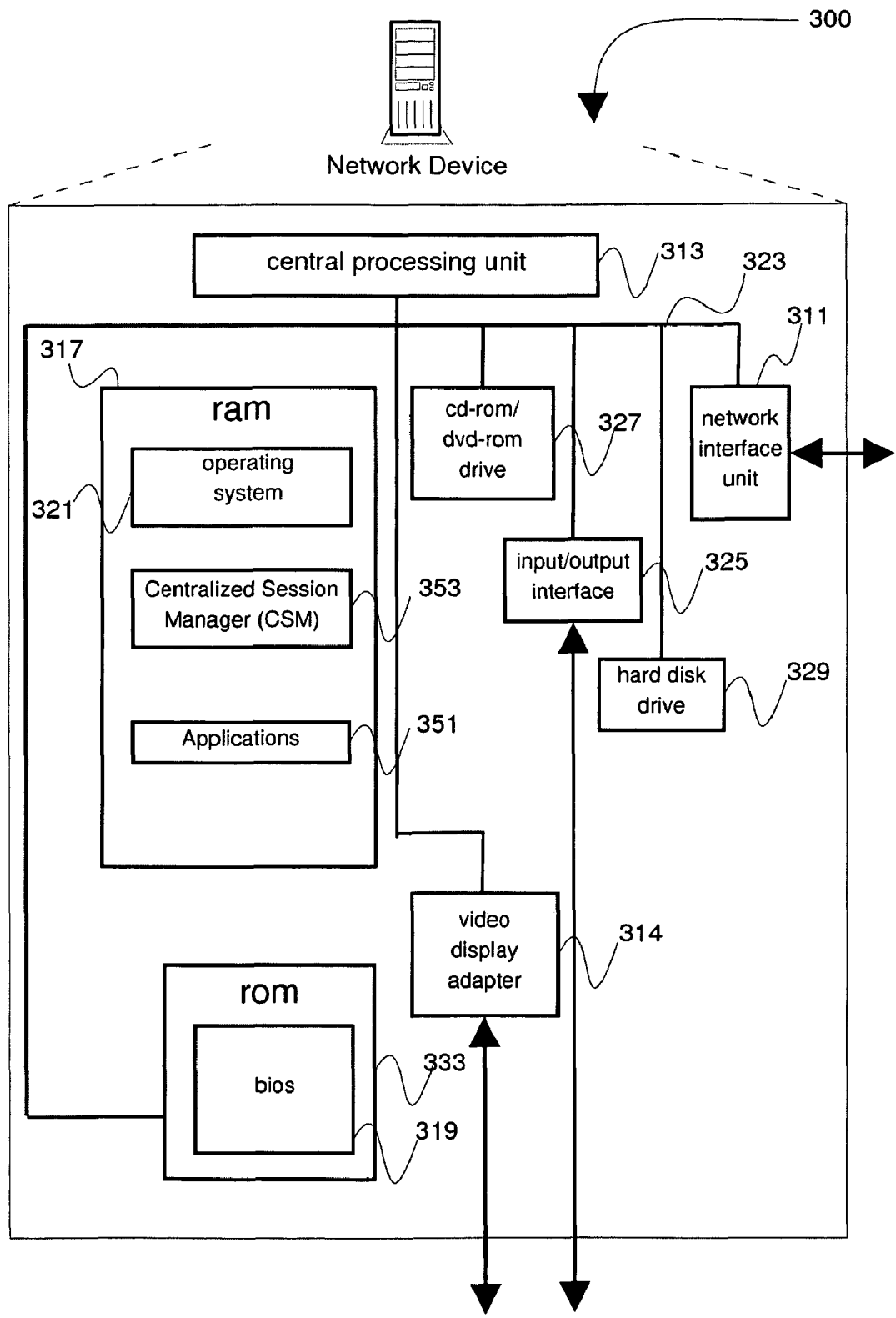
FIG. 3 illustrates a functional block diagram of an exemplary network device according to one embodiment.

FIG. 3—Illustrative Network Device

FIG. 3 illustrates one embodiment of a network device, according to one embodiment of the invention. Network device 300 may include many more or less components than those shown. The components shown, however, are sufficient to disclose an illustrative embodiment for practicing the invention. The network device 300 may represent, for example, the NMD 110 of FIG. 1.

The network device 300 may include processing unit 313, video display adapter 315, and a memory, which may be in communication with each other via bus 323. The memory generally includes RAM 317, ROM 333, and/or one or more permanent mass storage devices, such as hard disk drive 329, a tape drive, an optical drive, and/or a floppy disk drive, among others. The memory may store the operating system 321 for controlling operation of the network device 300.

As illustrated in FIG. 3, the network device 300 may also communicate with the Internet, or some other communications network, such as the network 106 in FIG. 1, e.g., via the network interface 311, which may be configured for use with various communication protocols including the TCP/IP protocol. The network interface unit 311 is sometimes known as a transceiver, transceiving device, or network interface card (NIC).

The network device 300 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 300 may further include other applications that support virtually any secure connection, including TLS, TTLS, EAP, SSL, IPSec, and the like. Similarly, the network device 300 may include applications that support a variety of tunneling mechanisms, such as VPN, PPP, L2TP, and so forth.

The network device 300 may also include input/output interface 325 for communicating with external devices, such as a mouse, keyboard, scanner, or other input devices not shown in FIG. 3. Likewise, the network device 300 may further include additional mass storage facilities such as CD-ROM/DVD-ROM drive 327 and hard disk drive 329. Hard disk drive 329 may be utilized to store, among other things, application programs, databases, and the like.

In one embodiment, the network device 300 includes at least one Application Specific Integrated Circuit (ASIC) chip (not shown) coupled to the bus 323. The ASIC chip can include logic that performs some of the actions of the network device 300. For example, in one embodiment, the ASIC chip can perform a number of packet processing functions for incoming and/or outgoing packets. In one embodiment, the ASIC chip can perform at least a portion of the logic to enable the operation of session manager 353.

In one embodiment, the network device 300 can further include one or more programmable hardware elements, e.g., field-programmable gate arrays (FPGA) (not shown), instead of, or in addition to, the ASIC chip. A number of functions of the network device 300 can be performed by the ASIC chip, the FPGA, by CPU 313 with instructions stored in memory, or by any combination of the ASIC chip, FPGA, and CPU.

The memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory may also store program code and data. One or more applications 351 (program instructions) may be loaded into memory and run (executed) on the operating system 321. Examples of application programs may include email programs, routing programs, schedulers, calendars, database programs, word processing programs, web browsers, traffic monitoring programs, security programs, and so forth.

The operating system 321 may further include networking components (not shown) that enable network device to monitor network traffic and/or establish and maintain network connections with at least another computing device. As such, the operating system 321 may include various components to manage operations of the Open Systems Interconnection (OSI) network stack, including Internet Protocol (IP), TCP, UDP, SSL, HTTP, and the like.

FIG. 4—Adaptive Network Traffic Classification Using Historical Context

FIG. 4 is a flowchart diagram illustrating an exemplary process for adaptive network traffic classification using historical context. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that various ones of the method elements may be implemented, for example, within or by the NMD 110 of FIG. 1. As shown, this method may operate as follows.

As shown in FIG. 4, process 400 begins, after a start block, at block 402, where data is read from the network. This may correspond to the receipt of one or more packets, Ethernet frames, or other transmission unit over a carrier medium. Upon receiving such data, processing then flows to decision block 404. The data may correspond to one or more packets from each of a plurality of connections. The plurality of connections may be related (or may be unrelated).

At decision block 404, the data is examined in order to determine whether it corresponds to data that has been previously classified. Network data corresponds when a set of identifying characteristics is the same. Such identifying characteristics may include, for example, the hardware address, the IP address, the IP protocol, the layer-4 ports, and the like. However, these combinations need not be so constrained, and additional characteristics may be readily added without deviating from the spirit and scope of the invention. If the data has been previously classified, processing flows to protocol parsing block 414. Otherwise, processing flows to classification rule block 406.

At block 406, one or more prioritized classification rules are evaluated with respect to the received data. In one embodiment, these rules are evaluated in series according to the priority of each rule. This might be done in order to limit the amount of processing required for classification. In another embodiment, two or more classification rules may be evaluated in parallel. If more than one rule results in a match, the conflict might be resolved according to the priority of the rule. In another embodiment, the conflict might result in the evaluation of additional rules or more detailed inspection of the data. Processing then flows to decision block 408.

At decision block 408, the results of the prioritized classification match are examined. If the data matches a classification rule, processing flows to protocol parsing block 414. Otherwise, processing flows to decision block 410.

At decision block 410, the state of the system is evaluated to determine whether all present classification rules have been evaluated for the data. If so, processing flows to block 412. Otherwise, processing flows to block 420.

At block 412, the classification of the data is recorded as unknown. Processing then flows back to I/O block 402, whereupon further data is awaited and read.

At block 414, data is sent to the protocol parser. Processing then flows to block 416.

At block 416, the results of the protocol parsing operation are examined. If the protocol parser accepts the data sent to it, processing flows to block 418. If the protocol parser rejects the data, then processing flows to block 420. In one embodiment, protocol parsing fails when the data does not conform to the protocol specification.

At block 418, the results of the successful classification in block 406 are recorded. Control then flows back to I/O block 402, whereupon further data is awaited and read.

At block 420, the unmatched (from block 410) or parser-rejected (from block 416) classification rules are deprioritized such that they will not be evaluated again for data with the same identifying characteristics. Control then flows back to block 406.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
    a first computer system receiving first data over a network, wherein the first data comprises a plurality of packets from each of a plurality of connections, wherein the plurality of connections are between a corresponding first endpoint and a corresponding second endpoint, wherein the first computer system does not participate in communication between the first and second endpoints;
    the first computer system automatically classifying at least one connection according to an application protocol, wherein said classifying is based on the first data and uses one or more classification rules to produce classified data;
    after said classifying, the first computer system automatically determining if the classified data of the at least one connection conforms to an application protocol specification of the application protocol;
    if the classified data does not conform to the application protocol specification, the first computer system automatically modifying the one or more classification rules such that later data with identifying characteristics similar to that of the at least one connection are not classified in the same manner.

2. The method of claim 1, wherein said classifying the at least one connection comprises determining one or more identifying characteristics of the packets of the at least one connection.

3. The method of claim 2, wherein said classifying the at least one connection comprises determining if a previous connection having the one or more identifying characteristics has been classified; and
    if the previous connection has been classified, classifying the at least one connection according to the classification of the previous connection.

4. The method of claim 1, further comprising:
    if the classified data conforms to the application protocol specification, performing said receiving data, said classifying, and said determining a plurality of times.

5. The method of claim 1, wherein said modifying the one or more classification rules comprises deprioritizing the one or more classification rules.

6. A tangible non-transitory memory medium comprising program instructions, wherein the program instructions are executable to:
    receive first data over a network, wherein the first data comprises a plurality of packets from each of a plurality of connections, wherein the plurality of connections are between a corresponding first endpoint and a corresponding second endpoint;
    automatically classify at least one connection according to an application protocol, wherein the classification is based on the first data and uses one or more classification rules to produce classified data;
    automatically determine if the classified data conforms to an application protocol specification of the application protocol;
    if the classified data does not conform to the application protocol specification, automatically modify the one or more classification rules such that later data with identifying characteristics similar to that of the at least one connection are not classified in the same manner;
    wherein the reception, classification, determination, and modification does not involve participation in the communication between the first and second endpoints.

7. The memory medium of claim 6, wherein in classifying the at least one connection the program instructions are further executable to determine one or more identifying characteristics of packets of the at least one connection.

8. The memory medium of claim 7, wherein said classifying the at least one connection comprises determining if a previous connection having the one or more identifying characteristics has been classified; and
    if the previous connection has been classified, classifying the at least one connection according to the classification of the previous data.

9. The memory medium of claim 6, wherein if the classified data conforms to the application protocol specification, the program instructions are executable to perform said receiving data, said classifying, and said determining a plurality of times.

10. The memory medium of claim 6, wherein said modifying the one or more classification rules comprises deprioritizing the one or more classification rules.

11. The method of claim 1, wherein said classifying comprises reconstructing a stream of data of the at least one connection from the respective plurality of packets.

12. The memory medium of claim 6, wherein said classifying comprises reconstructing a stream of data of the at least one connection from the respective plurality of packets.

13. A network monitoring device, comprising:
at least one input for receiving first data over a network, wherein the first data comprises a plurality of packets from each of a plurality of connections, wherein the plurality of connections are between a corresponding first endpoint and a corresponding second endpoint; and
logic coupled to the at least one input, wherein the logic is configured to:
automatically classify at least one connection according to an application protocol, wherein the classification is based on the first data and uses one or more classification rules to produce classified data;
automatically determine if the classified data conforms to an application protocol specification of the application protocol;
if the classified data does not conform to the application protocol specification, automatically modify the one or more classification rules such that later data with identifying characteristics similar to that of the at least one connection are not classified in the same manner;
wherein the network monitoring device does not participate in the communication between the first and second endpoints.

14. The network monitoring device of claim 13, wherein the logic comprises one or more of an application specific integrated circuit or a field programmable gate array (FPGA).

15. The network monitoring device of claim 13, wherein the logic comprises a processor and memory medium.

16. The network monitoring device of claim 13, wherein in classifying the at least one connection the logic is further configured to determine one or more identifying characteristics of packets of the at least one connection.

17. The network monitoring device of claim 16, wherein said classifying the at least one connection comprises determining if a previous connection having the one or more identifying characteristics has been classified; and
if the previous connection has been classified, classifying the at least one connection according to the classification of the previous data.

18. The network monitoring device of claim 13, wherein said modifying the one or more classification rules comprises deprioritizing the one or more classification rules.

19. The network monitoring device of claim 13, wherein said classifying comprises reconstructing a stream of data of the at least one connection from the respective plurality of packets.

* * * * *